April 5, 1932.   O. M. SUMMERS   1,852,033

CHECK VALVE

Filed Nov. 25, 1925

Inventor
Otto M. Summers
By Spencer Sewall and Hardman
his Attorneys

Patented Apr. 5, 1932

1,852,033

UNITED STATES PATENT OFFICE

OTTO M. SUMMERS, OF DAYTON, OHIO, ASSIGNOR, BY MESNE ASSIGNMENTS, TO FRIGID-AIRE CORPORATION, A CORPORATION OF DELAWARE

CHECK VALVE

Application filed November 25, 1925. Serial No. 71,409.

This invention relates to check valves for fluid pumps and compressors, and particularly for the compressor pump used in refrigerating apparatus.

One of the objects of the present invention is to provide a valve which will operate with the highest degree of quietness, in order that the valve may be adapted for use in refrigerating apparatus of the household type.

Further objects and advantages of the present invention will be apparent from the following description, reference being had to the accompanying drawings, wherein a preferred form of the present invention is clearly shown.

Figure 1:
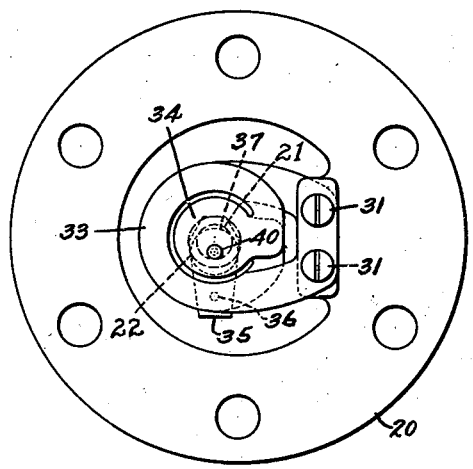
Fig. 1 is a plan view of a valve embodying the present invention.
Figure 2:
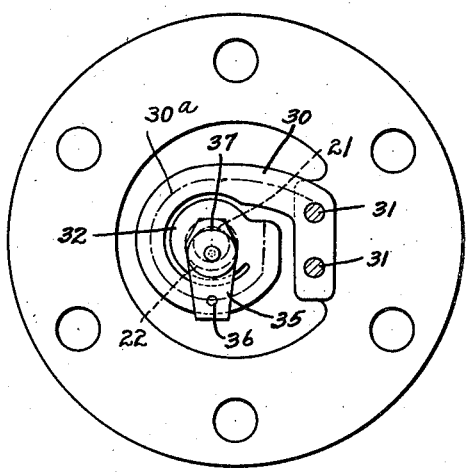
Fig. 2 is a plan view with the valve spring removed.
Figure 3:
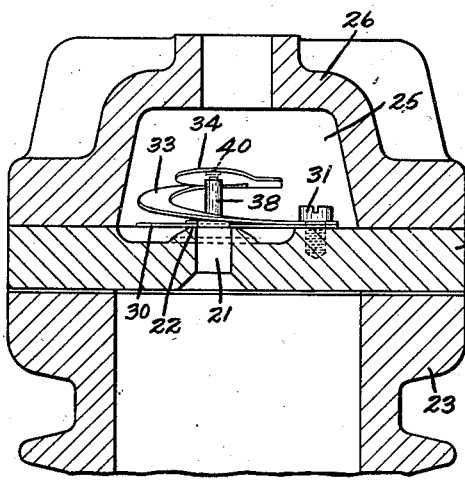
Fig. 3 is a fragmentary sectional view of a compressor pump provided with the valve shown in Fig. 1, the valve being located on its seat.

Referring to the drawings, 20 designates a valve plate which is provided with an aperture 21 and a flat annular valve seat 22 surrounding the aperture. The valve plate 20 provides the end of a compressor pump cylinder 23, within which reciprocates a piston 24. The valve plate 20 also provides the bottom wall of a fluid-outlet chamber 25, the side and top walls of which are provided by the compressor head 26.

A valve cooperates with the seat 22 and includes an elastic member or reed of material such as spring steel, having a valve portion in the form of a disk 32 and an elongated portion 30 for connecting the valve disk to the seat. This connection is effected by rigidly attaching the end of the portion 30 to a portion of the valve plate 20 which is in the plane of the seat 22 by means of screws 31. The connecting portion is in the form of a relatively thin wide spring and is thus flexible and elastic in a direction perpendicular to the plane of the valve seat, but is substantially rigid in a direction parallel to the plane of the seat. Thus the valve is connected to the seat in such a manner that, although it may leave the seat, the relative positions of the seat and valve upon contact remain constant. Therefore wear of the valve and/or seat tends to fit the valve and the seat to each other.

The connecting portion 30 is relatively long to provide greater resiliency, and the valve disk 32 is disposed on one side of the axis 30a of the connecting portion, and preferably on one side of the whole connecting portion, so that when the valve is unseated the connecting portion may partake of both twisting about its axis and bending along its axis and thus afford greater resiliency than if it were distorted in one of these directions alone. Preferably the connecting member 30 is curved, the curved portion including an arc of approximately 360° and surrounding the valve disk and valve seat. This arrangement increases the resiliency due to the curved form, and also provides a compact valve having a relatively long connecting member within a relatively small space. The valve reed is thus in the general form of an involute.

Figure 4:
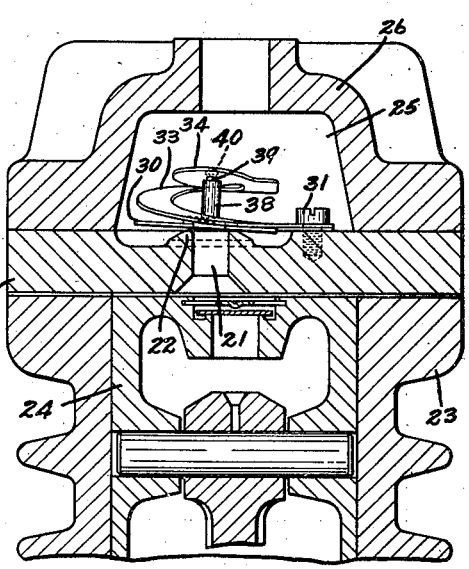
Fig. 4 is a view similar to Fig. 3, showing the valve tilted upon its seat.
Figure 5:
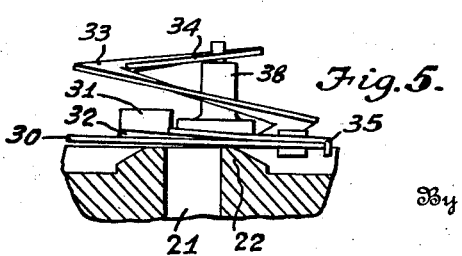
Fig. 5 is a view of a portion of the compressor shown in Fig. 4, the view being taken at right angles to Fig. 4.

The reed is normally flat and since its end is rigidly secured to a surface in the plane of the seat, the valve closes on the seat through its inherent tendency to assume its normal shape. The valve thus lies flat against the seat without distortion and without exerting appreciable force on the seat. In order to close the valve upon the seat with sufficient force to provide a contact which will seal relatively high pressures, for example of the order of 100 pounds per square inch, the valve is yieldingly held against the seat by a thrust member or stud 38 which is pressed against the valve by a normally flat spring 33. The spring 33 may be, and in fact preferably is, identical in shape with the reed 30, and is reversed with respect to the latter. The spring 33 is secured to the valve plate 20 by the same screws 31 which secure the valve reed 30, the inner end of the spring 33 terminating in a disk 34 which is in alignment with the valve disk 32 and seat 22. The wear-piece 35 is placed over the valve disk and is attached to the valve reed by a rivet 36. The stud 38 terminates in a flat foot 37 which slidingly bears upon the wear-piece 35, and a reduced portion 39 at the upper end of the stud extends loosely through a hole in the disk 34 and is riveted over slightly as indicated by 40, in order that the stud may remain attached to the spring 33. The riveted portion of the stud is sufficiently loose to permit the swinging of the stud with respect to the disk 34 without distorting the disk. The foot of the stud 38 is disposed eccentrically with respect to the valve port 21 and the axis of the stud remains perpendicular to the plane of the disk 32, so that the resultant of the forces tending to seat the valve acts in a line which passes outside the center of fluid pressure tending to unseat the valve. This line passes between the center of the pressure and the axis 30a, however formed, so as to cause the spring portion 30 always to partake of twisting and bending when the valve is unseated. The force tending to unseat the valve and the force tending to seat the valve thus form a couple which causes the valve to tip upon its seat whenever it is opened by the pressure of fluid in the opening 21. The tilting of the valve upon opening is shown in Figs. 4 and 5. The valve is thus always titled upon its seat and it may or may not leave the seat entirely, depending upon the pressure of fluid within the opening 21. If the valve is moved completely off the seat, when it returns to the seat all points of the valve do not engage the seat simultaneously but progressively. Therefore the valve does not close with a slap and its operation is relatively quiet.

It is intended that in normal operation the valve will not leave the seat completely but will tip upon the seat and will always close with a gentle action producing practically a noiseless operation.

While the form of embodiment of the invention as herein disclosed, constitutes a preferred form, it is to be understood that other forms might be adopted, all coming within the scope of the claims which follow.

What is claimed is:

1. A fluid check valve comprising, in combination, a member providing a port and a rigid valve seat surrounding the port, a reed fixed at one end and having a valve portion at its free end engaging said seat, and yielding means seating the valve portion, said means applying yielding pressure upon said valve portion eccentrically of the seat in order that the valve portion will be tilted relative to the seat when fluid is forced under pressure through said port.

2. A fluid check valve comprising, in combination, a member providing a port and a rigid valve seat surrounding the port, a reed of involute spiral configuration having its outer end fixed and its inner end providing a valve portion engaging said seat, and means for applying yielding pressure upon said valve portion eccentrically of the seat in order that the valve portion will be tilted relative to the seat when fluid is forced under pressure through said port.

3. A fluid check valve comprising, in combination, a member providing a port and a valve seat surrounding the port, a reed of involute spiral configuration having its outer end fixed and its inner end providing a valve portion engaging said seat, a leaf spring shaped like the reed and fixed at its outer end and having its inner end located adjacent said valve portion, and means for spacing the inner end portions of the reed and spring and for transmitting pressure exerted by the spring to the valve portion eccentrically of the valve seat in order that the valve portion will be tilted relative to the seat when fluid is forced under pressure through said port.

4. Apparatus of the character described, comprising in combination, a member provided with a valve seat having an opening for the passage of fluid, flexible means secured to said member having a valve adapted to engage said seat, said valve having an area exposed to the pressure of fluid in the opening, and means yieldingly urging the valve against the seat, the resultant of force of said means acting on the valve in a line passing outside the center of pressure on said area.

5. Apparatus of the character described, comprising in combination, a member provided with a valve seat having an opening for the passage of fluid, flexible means secured to said member having a valve adapted to engage said seat, said valve having an area exposed to the pressure of fluid in the opening, and means yieldingly urging the valve toward the seat comprising a spring secured at one end to said member, and spacing means between the other end of the spring and the valve, said spring urging said spacing means to exert a force whose resultant acts in a line passing through the valve outside of the center of pressure on said area.

6. A fluid check valve comprising in combination a valve seat having an opening for the passage of fluid, a valve adapted to engage the seat and having an area exposed to the pressure of fluid in the opening, means connecting the valve to the seat, and means causing the valve to tip before leaving the seat including means yieldingly urging the valve against the seat, the resultant of force of said last mentioned means acting on the valve in a line passing outside the center of pressure on said area.

7. A fluid check valve comprising in combination a valve seat having an opening for the passage of fluid, a valve adapted to engage the seat and having an area exposed to the pressure of fluid in the opening, flexible means connecting the valve to the seat, and means causing the valve to tip before leaving the seat, including means yieldingly urging the valve against the seat, the resultant of force of said last mentioned means acting on the valve in a line passing outside the center of pressure on said area.

8. A fluid check valve comprising in combination a valve seat having an opening for the passage of fluid, a valve adapted to engage the seat and having an area exposed to the pressure of fluid in the opening, elastic means connecting the valve to the seat and means causing the valve to tip before leaving the seat including means yieldingly urging the valve against the seat, the resultant of force of said last mentioned means acting on the valve in a line passing outside the center of pressure on said area.

9. A fluid check valve comprising in combination a valve seat having an opening for the passage of fluid, a valve adapted to engage the seat and having an area exposed to the pressure of fluid in the opening, means connecting the valve to the seat so that the relative positions of the valve and the seat upon contacting remain constant, and means causing the valve to tip before leaving the seat including means yieldingly urging the valve against the seat, the resultant of force of said last mentioned means acting on the valve in a line passing outside the center of pressure on said area.

10. A fluid check valve comprising in combination a valve seat having an opening for the passage of fluid, a valve adapted to engage the seat and having an area exposed to the pressure of fluid in the opening, means connecting the valve to the seat, said means permitting translation of the valve with respect to the seat and maintaining constant the relative positions of the valve and the seat upon contact, and means causing the valve to tip before leaving the seat including means yieldingly urging the valve against the seat, the resultant of force of said last mentioned means acting on the valve in a line passing outside the center of pressure on said area.

11. A fluid check valve comprising in combination a valve seat having an opening for the passage of fluid, a valve adapted to engage the seat and having an area exposed to the pressure of fluid in the opening, means connecting the valve to the seat, said means permitting tipping of the valve with respect to the seat and maintaining constant the relative positions of the valve and the seat upon contact, and means causing the valve to tip before leaving the seat including means yieldingly urging the valve against the seat, the resultant of force of said last mentioned means acting on the valve in a line passing outside the center of pressure on said area.

12. A fluid check valve comprising in combination a valve seat having an opening for the passage of fluid, a valve adapted to engage the seat and having an area exposed to the pressure of fluid in the opening, means connecting the valve to the seat, said means permitting both translation and tipping of the valve with respect to the seat and maintaining constant the relative positions of the valve and the seat at contact, and means causing the valve to tip before leaving the seat including means yieldingly urging the valve against the seat, the resultant of force of said last mentioned means acting on the valve in a line passing outside the center of pressure on said area.

13. A fluid check valve comprising in combination a valve seat having an opening for the passage of fluid, a valve adapted to engage the seat and having an area exposed to the pressure of fluid in the opening, means connecting the valve to the seat, said means being flexible in a direction normal to the seat and rigid in a direction parallel to the seat, and means causing the valve to tip before leaving the seat, including means yieldingly urging the valve against the seat, the resultant of force of said last mentioned means acting on the valve in a line passing outside the center of pressure on said area.

14. A check valve comprising in combination a valve seat having an opening for the passage of fluid, a leaf spring attached to the seat and providing a valve for said seat, having an area exposed to the pressure of fluid in the opening, a second spring, and means causing the valve to tip before leaving the seat including a thrust member disposed between said springs and acting in a line passing outside the center of pressure on said area.

15. A check valve comprising in combination a flat valve seat having an opening for the passage of fluid, a normally flat elastic valve cooperating with the seat and having an area exposed to the pressure of fluid in said opening, said valve tending to close on the seat by its inherent tendency to assume its normal shape, and means causing the valve to tip before leaving the seat, including means separate from the valve for yieldingly holding the valve against the seat and acting in a line passing outside the center of pressure on said area.

16. A check valve comprising in combination a flat valve seat, a normally flat elastic valve one point of which is rigidly secured with relation to the seat in such a manner that the valve is closed on the seat by its inherent tendency to assume its normal shape, said valve having an area exposed to the pressure of fluid in said opening, and means causing the valve to tip before leaving the seat, including means separate from the valve for yieldingly holding the valve against the seat and acting in a line passing outside the center of pressure on said area.

17. A check valve comprising a normally flat elastic member having a valve portion and an elongated planar connecting portion for securing the valve portion to a valve seat, the valve portion being disposed at one side of the axis of the connecting portion and being connected thereto to provide a tilting action.

18. A check valve comprising a normally flat elastic member having a valve portion and a curved planar connecting portion for securing the valve portion to a valve seat, the valve portion being disposed at one side of the axis of the connecting portion and being connected thereto to provide a tilting action.

19. A check valve comprising a normally flat elastic member having a valve portion and a curved planar connecting portion for securing the valve portion to a valve seat, the valve portion being disposed at one side of the connecting portion and being connected thereto to provide a tilting action.

20. A check valve comprising in combination a valve seat, an elastic member including a valve portion adapted to cooperate with the seat and an elongated connecting portion, one end of which is fixed with respect to the seat, and means for yieldingly urging the valve against the seat including a thrust member acting on the valve in a line passing outside the axis of the connecting portion.

21. A check valve comprising in combination a valve seat, an elastic member including a valve portion adapted to cooperate with the seat and an elongated connecting portion one end of which is fixed with respect to the seat, and means for yieldingly urging the valve against the seat including a thrust member acting on the valve in a line passing outside the connecting portion.

22. A check valve comprising in combination a valve seat having an opening for the passage of fluid, an elastic member including a valve portion having an area exposed to the pressure of fluid in the opening and an elongated connecting portion, one end of which is fixed with respect to the seat, the valve being adapted to close on the seat through the inherent tendency of the member to assume its normal shape, and means for both twisting and bending said member when the valve is opened by the pressure of fluid in the opening, including means for yieldingly urging the valve toward the seat, said means acting in a line passing outside of the center of pressure on said area.

23. A check valve comprising in combination a valve seat having an opening for the passage of fluid, an elastic member including a valve portion having an area exposed to the pressure of fluid in the opening and an elongated connecting portion, one end of which is fixed with respect to the seat, the valve being adapted to close on the seat through the inherent tendency of the member to assume its normal shape, and means for both twisting and bending said member when the valve is opened by the pressure of fluid in the opening, including means for yieldingly urging the valve toward the seat, said means acting in a line passing between the center of pressure on said area and the axis of the connecting portion.

24. A check valve comprising in combination a valve seat having an opening for the passage of fluid, an elastic member including a valve portion having an area exposed to the pressure of fluid in the opening and an elongated connecting portion, one end of which is fixed with respect to the seat, the valve being adapted to close on the seat through the inherent tendency of the member to assume its normal shape, and means for both twisting and bending said member when the valve is opened by the pressure of fluid in the opening, including means for yieldingly urging the valve toward the seat, said means acting in a line passing between the center of pressure on said area and the axis of the connecting portion.

25. A check valve comprising in combination a valve seat having an opening for the passage of fluid, an elastic member including a valve portion having an area exposed to the pressure of fluid in the opening and an elongated connecting portion, one end of which is fixed with respect to the seat, the valve being adapted to close on the seat through the inherent tendency of the member to assume its normal shape, and means for both twisting and bending said member when the valve is opened by the pressure of fluid in the opening, including means causing the valve to tip upon the seat.

In testimony whereof I hereto affix my signature.

OTTO M. SUMMERS.